United States Patent [19]

Tokuno

[11] 4,319,947

[45] Mar. 16, 1982

[54] SINGLE FACER WITH AUTOMATIC ROLL GAP CONTROL SYSTEM

[75] Inventor: Masateru Tokuno, Nishinomiya, Japan

[73] Assignee: Rengo Kabushiki Kaisha (Rengo Co., Ltd.), Osaka, Japan

[21] Appl. No.: 183,834

[22] Filed: Sep. 3, 1980

[30] Foreign Application Priority Data

Sep. 7, 1979 [JP] Japan .............................. 54-115914

[51] Int. Cl.[3] .............................................. B32B 13/00

[52] U.S. Cl. .................................... 156/351; 156/358; 156/360; 156/472; 425/141

[58] Field of Search ............................... 156/470–473, 156/205, 210, 361, 360, 64, 378, 351, 358; 425/141, 369, 396

[56] References Cited

U.S. PATENT DOCUMENTS

| | | | |
|---|---|---|---|
| 2,750,986 | 6/1956 | Russell et al. | 156/360 X |
| 2,988,641 | 6/1961 | Gough | 156/64 |
| 3,826,701 | 7/1974 | Miller | 156/64 |
| 3,843,434 | 12/1974 | Heiks | 156/360 X |
| 3,981,758 | 9/1976 | Thayer et al. | 156/470 |
| 4,071,392 | 1/1978 | Chaudhuri | 156/470 X |

*Primary Examiner*—David A. Simmons
*Attorney, Agent, or Firm*—Wenderoth, Lind & Ponack

[57] ABSTRACT

An improved single facer is proposed which is provided with a control system for automatically controlling the gap between the lower corrugating roll and the glue roll and/or that between the former and the press roll according to the thickness of the material passing between them. The thickness of the material and the gap between the rolls are detected and an electrical signal proportional to the difference between them is given to a drive motor, which moves the glue roll and/or the press roll toward and away from the lower corrugating roll.

3 Claims, 5 Drawing Figures

SINGLE FACER WITH AUTOMATIC ROLL GAP CONTROL SYSTEM

The present invention relates to an improved single facer for producing single-faced corrugated fibreboard, and particularly to a single facer in which the clearance between the lower corrugating roll and the glue roll and/or the clearance between the former and the press roll are automatically controlled according to the thickness of the corrugating medium and the linerboard passing between them.

FIG. 1 illustrates a conventional single facer for producing single-faced corrugated fibreboard. After passing around two guide rolls 1 and 2 and a shower device 3, a corrugating medium S is corrugated by being passed between a pair of corrugating rolls 4 and 5 engaging each other. A glue roll 6 partially immersed in a glue pan 7 is mounted under the lower corrugating roll 5 with such a clearance A that an appropriate amount of glue will be applied to the crests of the corrugations formed on the medium.

From the opposite side, a linerboard L is fed around heat rolls 8 and 9 and is pressed against the corrugated and glued medium by a press roll 10 which is disposed with a suitable clearance B from the lower corrugating roll 5 so that a single-faced corrugated fibreboard F is produced.

As described above, the clearance A between the lower roll 5 and the glue roll 6 and the clearance B between the lower roll 5 and the press roll 10 must be adjusted precisely. Maladjustment would result in the production of defective fibreboard. Therefore, an operator had to check and readjust the clearance by hand each time the thickness of the medium or the linerboard changes. This adjustement of clearance must be accurate particularly on a single facer of that type in which the corrugated medium is fed under suction by the lower corrugating roll until it is brought into contact with the press roll.

If the clearance between the lower corrugating roll 5 and the glue roll 6 or the press roll 10 were too small, paper breakage or decreased strength would result. On the other hand, excessive clearance would cause poor adhesion of the linerboard to the corrugated medium. This necessitated manual readjustment of the clearance upon each change of the material. For the adjustment of the roll clearance in a single facer, a control system has to react quickly to any change in the thickness of the medium or linerboard which may change from lot to lot and even in the same lot.

An object of the present invention is to provide a single facer which permits automatic adjustment of the clearance between the rolls in response to any change in the thickness of the medium or linerboard, whereby lightening the work of the operator and improving and stabilizing the quality of corrugated fibreoard produced.

Other objects and features of this invention will become apparent from the following description taken with reference to the accompanying drawings, in which.

Figure 1:
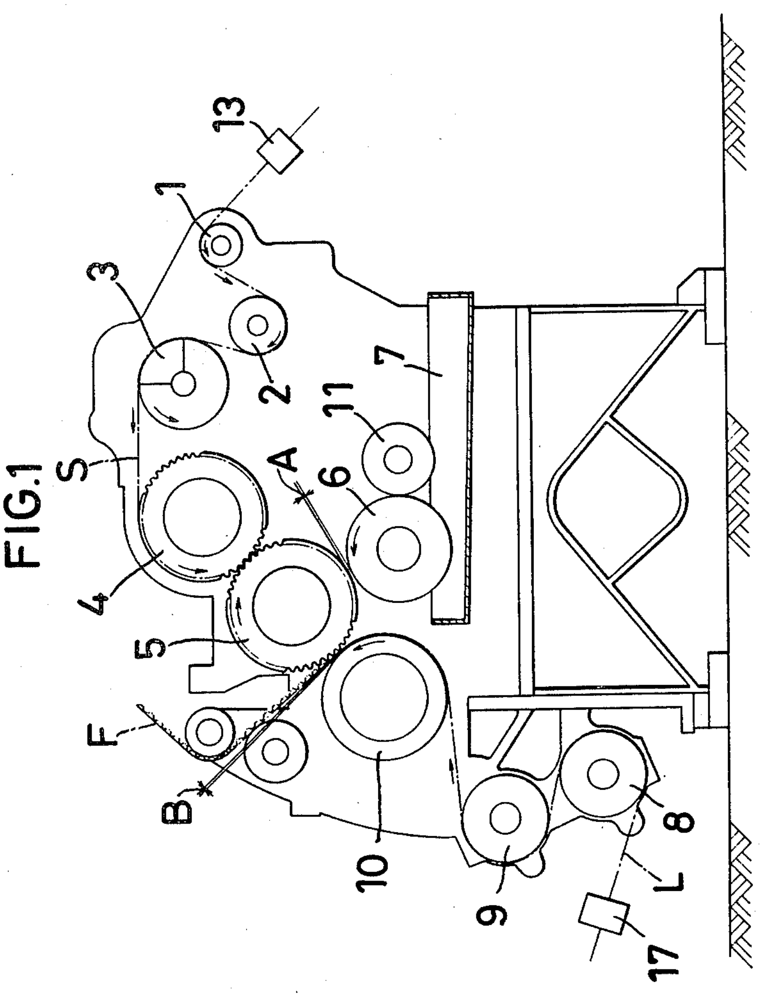
FIG. 1 is an illustration showing a conventional single facer.
Figure 2:
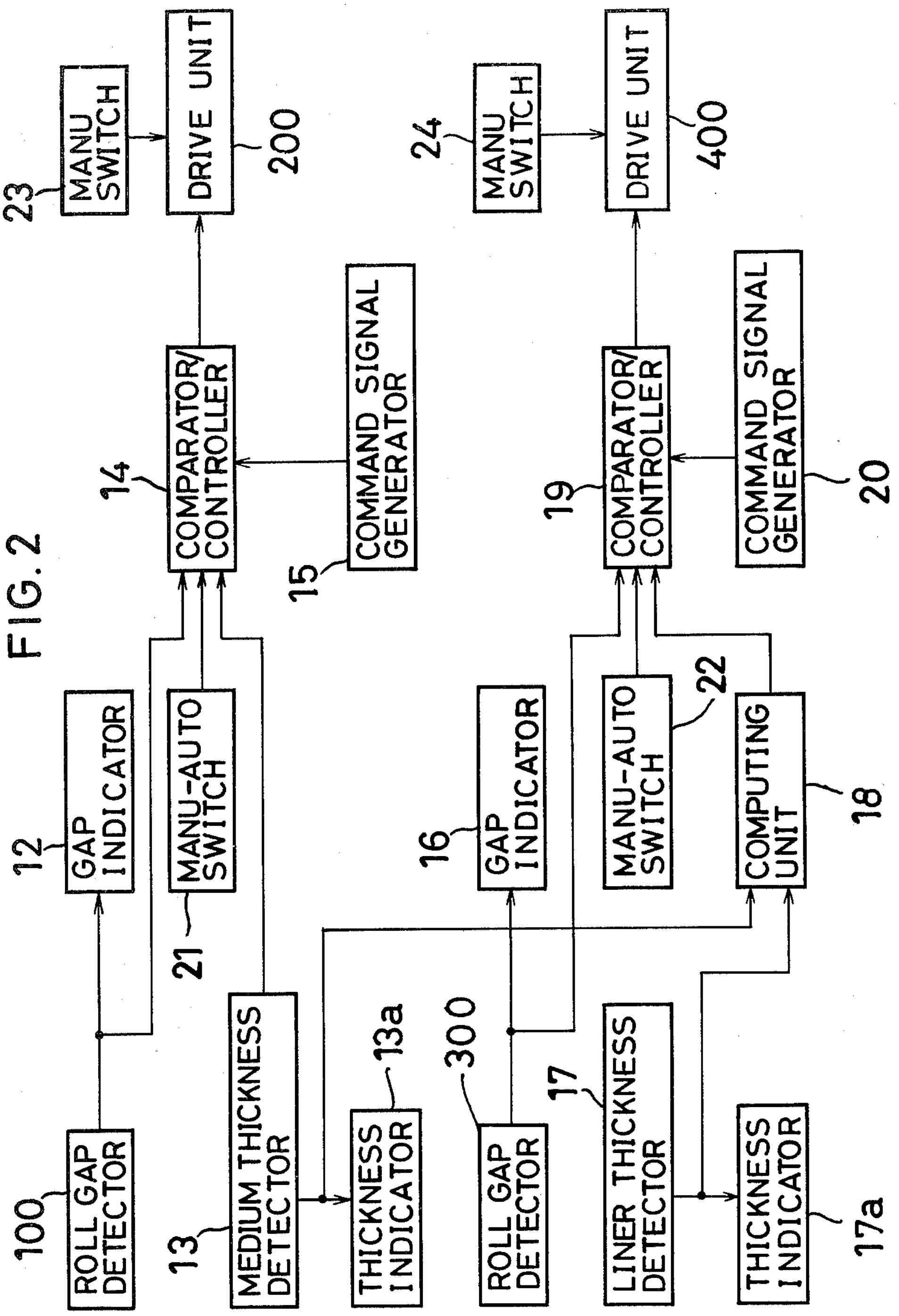
FIG. 2 is a block diagram of a control system embodying this invention.

Referring to Fig. 2 illustrating a block diagram of an embodiment of the present invention, a clearance detection unit 100 detects the clearance A between the lower roll 5 and the glue roll 6 and outputs an amplified electrical signal proportional to the clearance, which is indicated by a clearance indicator 12. A medium thickness detection unit 13 detects the thickness of the corrugating medium S and outputs an amplified electrical signal proportional to the thickness, which is indicated by a thickness indicator 13*a*. The output from the detection unit 100 is compared with the output from the detection unit 13 by a comparator/controller 14 which is a kind of sequential logic circuit. It compares two inptuts and gives a signal proportional to the result of comparison to a driving unit 200 for adjusting the clearance A between the lower roll 5 and the glue roll 6 so that these two inputs will be equal to each other. The comparator/controller 14 operates in response to the signal from a control command signal generator 15.

Similarly, the clearance B between the lower roll 5 and the press roll 10 is detected by a roll clearance detection unit 300 and indicated by a clearance indicator 16. The thickness of a linerboard L is detected by a thickness detection unit 17 and indicated by a thickness indicator 17*a*. The amplified electrical signal from the liner thickness detection unit 17 and the signal from the thickness detection unit 13 for the corrugating medium are given to a computing unit 18 where they are latched and computed to obtain the total thickness. The output from the roll clearance detection unit 300 is compared with the signal from the computing unit 18 in a second comparator/controller 19 which is a kind of sequential logic circuit, too. The comparator/controller compares two inputs and gives a signal proportional to the difference therebetween to a driving unit 400 for adjusting the clearance B between the lower roll 5 and the press roll 10 so that two inputs thereto will become equal to each other. The comparator/controller 19 operates in response to the signal from a command signal generator 20.

Although in the above-mentioned arrangement the signals from the comparator/controllers 14 and 19 to the driving units 200 and 400 are such that two inputs to the comparator/controller will become equal to each other, the comparator/controller may be designed to operate so as to give such signals that these two inputs will have some predetermined relation to each other. The command signal generators 15 and 20 may be interlocked with the corrugating machine so that they will give a command signal upon the start of the machine, for example.

If the automatic control system fails, the mode of control can be switched to manual control by turning AUTO-MANUAL switches 21 and 22 to the manual side. Now no signals are given from the comparator/controllers 14 and 19. Also, the operator can operate switches 23 and 24 to give suitable signals to driving units 200 and 400.

Figure 3:
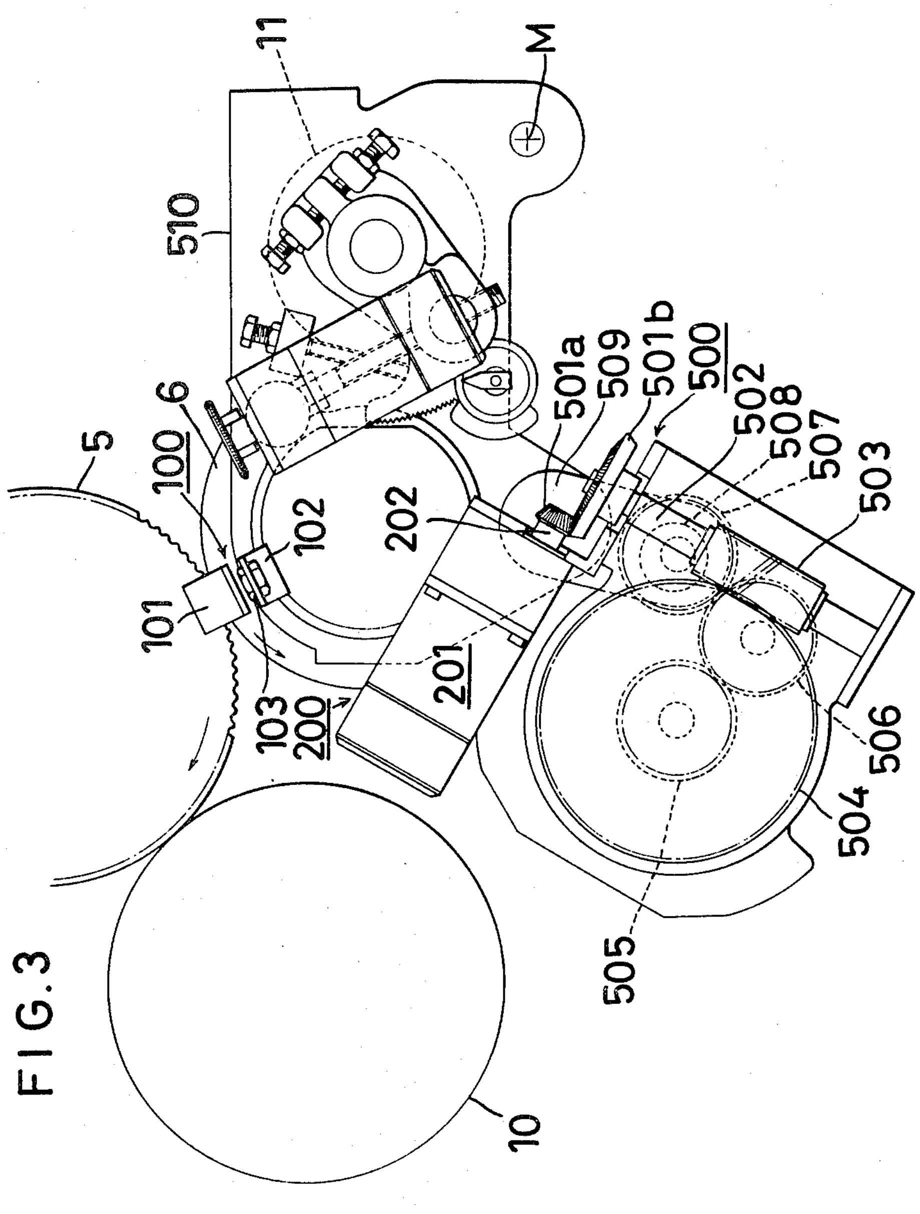
FIG. 3 is a schematic view showing how the clearance between the lower corrugating roll and the glue roll is adjusted.

Next, by refering to FIG. 3, we shall describe how the clearance between the lower corrugating roll 5 and the glue roll 6 is adjusted. Conventionally, by turing a handle, the operator actuated a glue roll moving unit generally designated by numeral 500 to move the glue roll 6 toward and away frm the lower roll 5. In the arrangement of FIG. 3, the unit 500 is automatically driven by the driving unit 200 which comprises a motor 201 and an output shaft 202 whose rotation is transmitted to the glue roll moving unit 500.

The operation of the glue roll moving unit 500 will be described below.

A bevel gear 501*a* fixed on the output shaft 202 of the motor engages another bevel gear 501*b* fixed on a screw shaft 502. Thus, the rotation of the motor 201 is transmitted to the screw shaft 502, then through a worm gear 503 mounted on the screw shaft to a worm wheel 504 engaging the worm gear 503. Because a drive gear 505 has a shaft common with the worm wheel 504, its rotation is transmitted through an idle gear 506 to a gear 507. The gear 507 has a boss 508 protruding from one side thereof, the boss being eccentric to the center of the gear. The boss 508 is rotatably mounted in a hole provided at one end of a coupling lever 509, the other end of which is pivotably mounted on a frame 510 for the glueing unit.

The shafts of the gears 505, 506 and 507 are supported on the machine frame (not shown). As the gear 507 turns, the coupling lever 509 goes up and down for a distance depending upon the eccentricity of the boss 508, so that the frame 510 slightly tilts around the point M. Since the glue roll 6 has its shaft supported on the frame 510, as the frame 510 tilts or sways, the glue roll 6 moves toward and away from the lower roll 5 which is supported on the machine frame. Thus, the more the frame 510 sways, the larger the displacement of the glue roll 6 with respect to the lower roll 5 is.

The amount of its displacement is detected by a roll clearance detection unit 100 which includes a receiving piece 101 secured to the machine frame and a sensor 103 mounted on the sensor stand 102 secured to the frame 510. As the frame 510 and thus the glue roll 7 move, the sensor 103 moves toward and away from the fixed receiving piece 101, detecting the clearance between the lower roll 5 and the glue roll 6.

Figure 4:
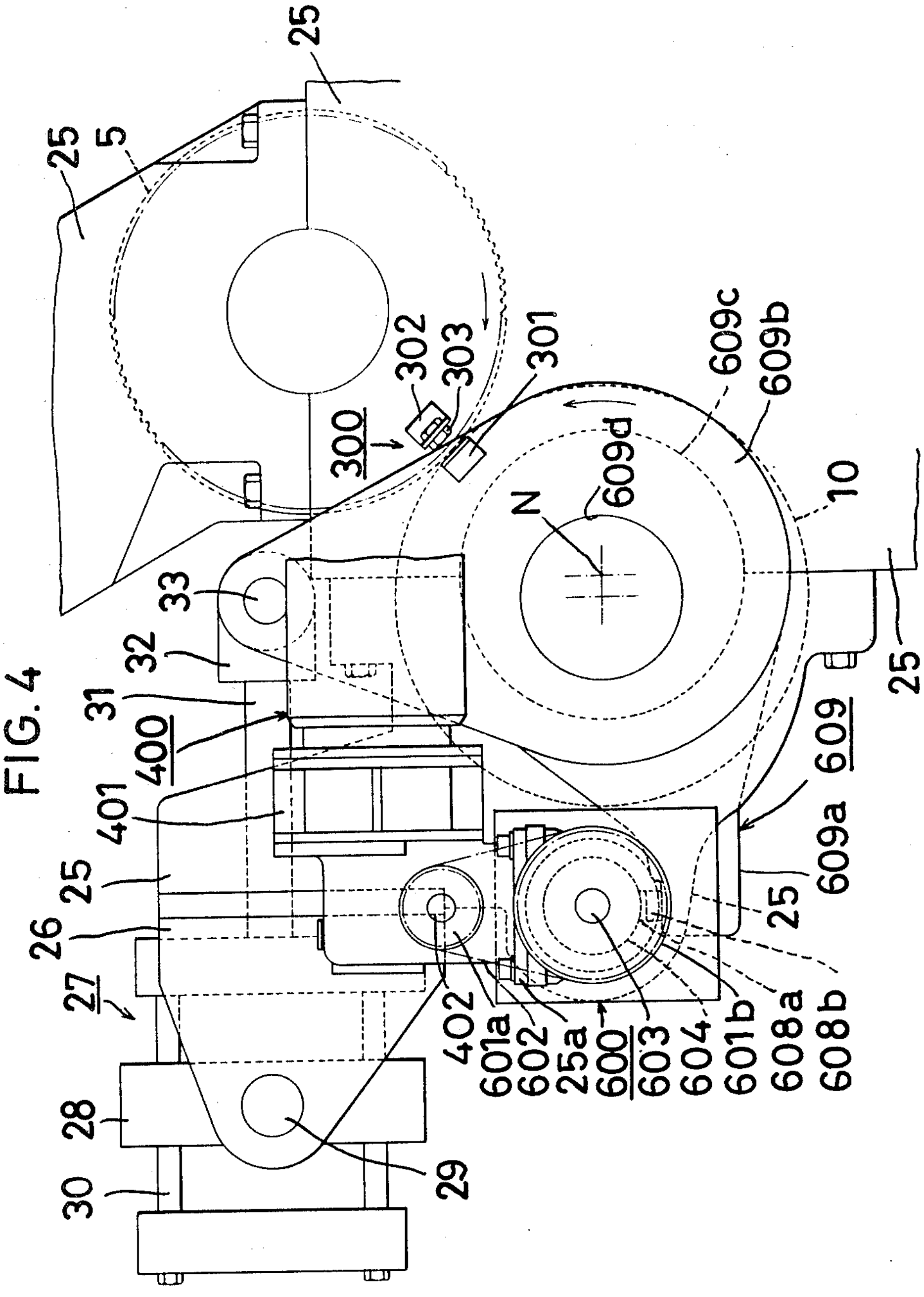
FIG. 4 is a schematic view showing how the clearance between the lower roll and the press roll is adjusted.
Figure 5:
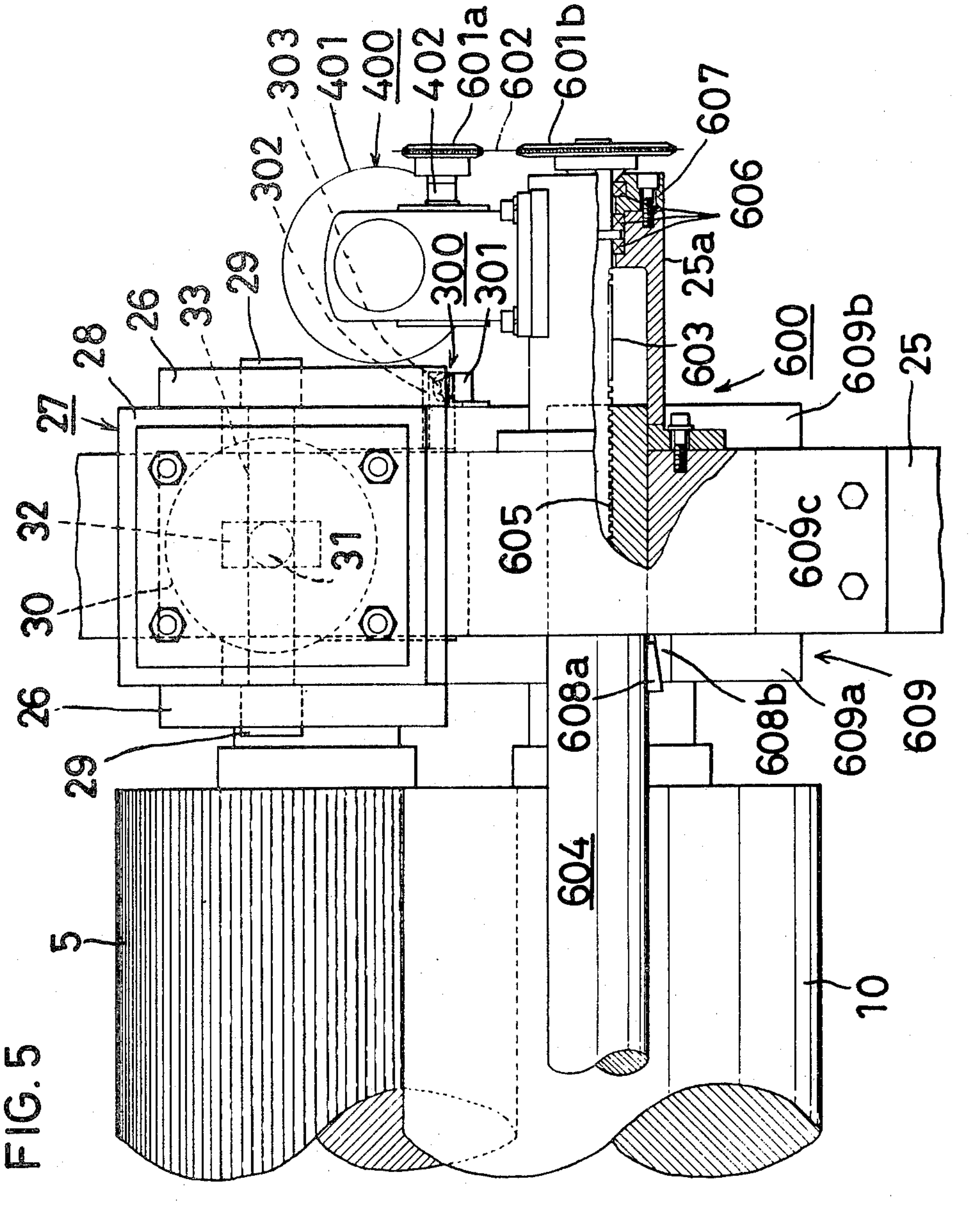
FIG. 5 is a partially cutaway side view of a portion of Fig. 4.

While the machine is not running, the fulcrum point M is kept in its lower inoperative position by a lever (not shown) where the glue roll 6 is far away from the lower roll 5. The glue roll moving unit 500 described above is not novel but conventional. Next, how the clearance between the lower roll 5 and the press roll 10 is adjusted will be described with reference to FIGS. 4 and 5.

Conventionally, a press roll moving unit generally designated by numeral 600 was manually operated by means of a handle to move the press roll 10 toward and away from the lower roll 5. In the preferred embodiment, the unit 600 is automatically driven by a driving unit 400 instead of a handle. The unit 600 itself is conventional.

The driving unit 400 includes a motor 401 mounted on a bracket 25*a* and its output shaft 402 whose rotation is transmitted to the press roll moving unit 600 which shall be described below.

A chain wheel 601*a* mounted on the motor shaft 402 is coupled to another chain wheel 601*b* by a chain 602 and a screw shaft 603 is integral and coaxial with the chain wheel 601*b*. Thus, the rotation of the motor shaft 402 is transmitted to the screw shaft 603. Since the screw shaft threadedly engages a female screw 605 on the inside of the gap adjust shaft 604, the shaft 604 moves in a horizontal direction as the screw shaft turns. Parts 606 are bearings and 607 is a bearing cap.

A wedge 608*a* is secured to the gap adjust shaft 604 and another wedge 608 *b* is secured to a side plate 609*a* of a press arm 609 in an opposed relation to the wedge 608*a*. The press arm 609 includes a round metal 609*c* and an opposed pair of side plates 609*a* and 609*b* secured to the round metal. The round metal 609*c* is provided with a hole 609*d* eccentric to its center to rotatably receive the shaft of the press roll 10. The round metal 609*c* is rotatably supported on the machine frame 25.

Thus, when the gap adjust shaft 604 moves in a horizontal direction, the movement is transmitted through the wedges 608*a* and 608*b* to the side plates 609*a* and 609*b* of the press arm, which will swing around the center N of the round metal 609*c*. Since the round metal is integral with the side plates, it will turn slightly, too. As the round metal turns, the press roll 10 supported in its eccentric hole 609*d* moves toward and away from the lower roll 5. Any change in the clearance between the press roll 10 and the lower roll 5 is detected by a gap detection unit 300 which consists of a receiving piece 301 fixed on the side plate 609*b* and a sensor 303 mounted on a sensor stand 302 on the machine frame 25.

An air cylinder unit 27 of a center trunnion type is mounted on a bracket 26 secured to the machine frame 25. It consists of a trunnion 28, a trunnion shaft 29, a cylinder 30, a piston rod 31, a clevis 32, and a pin 33 extending from the clevis and pivotally coupled to the side plates 609*a* and 609*b*.

While the single facer is running, the piston rod 31 is in its protruded position to keep the pair of wedges 608*a* and 608*b* in contact with each other. While the single facer is shut down, the piston rod is in its retracted position to allow the wedges to be away from each other. In this state, the press roll 10 is kept away from the lower roll 5.

In the pipeline to the air cylinder unit 27 is provided a relief valve (not shown) to keep the pressure in the unit 27 below a preset pressure, thereby assuring that the press arm 609 can swing freely with the pair of wedges kept in contact with each other. If the pressure became too high, the press arm 609 could not swing any more, thus getting stuck.

It will be understood from the foregoing that according to the present invention the gap between the glue roll and the lower roll and that between the press roll and the lower roll are automatically and quickly controlled according to any change in the thickness of the material. No manual adjustments by the operator are required. Automatic adjustment of the gaps between the rolls improves the quality of the final products and facilitates the quality control.

Because in operation a single facer tends to produce a considerably large noise sometime exceeding 100 phons, the entire machine has to be enclosed in a housing. Manual adjustment in a very limited space is almost prohibitive. The single facer in accordance with the present invention is particularly advantageous in this sense, too.

The present invention can also be applied to adjust the gap between the glue roll 6 and the doctor roll 11 in a similar manner to that described above.

Although in the preferred embodiment the conventional roll moving units are employed, this does not mean any limitation to this invention. Any other mechanism may be used.

What we claim:

1. A single facer comprising a pair of corrugating rolls, a glue roll for glueing a corrugated medium, a press roll for pressing a linerboard against the corrugated and glued medium to paste them together, roll moving means for moving said glue roll and/or press roll toward and away from one of said corrugating rolls, and a system for controlling the clearance between said one of the corrugating rolls and said glue roll and/or said press roll, said system comprising;

a roll clearance detecting means for detecting the clearance between the rolls and giving a signal proportional to the clearance;

a thickness detecting means for detecting the thickness of said medium and/or said linerboard and giving a signal proportional to the thickness;

a comparator/controller means receiving the signal from said roll clearance detecting means and the signal from said thickness detecting means, comparing them with each other and giving a control signal proportional to the result of comparison; and a driving means receiving said control signal to drive said roll moving means to move said glue roll and/or said press roll toward and away from said one of the corrugating rolls, whereby adjusting the clearance between these two rolls.

2. A single facer as claimed in claim 1 wherein said thickness detecting means includes two thickness detectors, one for said medium and the other for said linerboard, said comparator/controller means receiving the signals from said two thickness detectors and the signal from said roll clearance detecting means.

3. A single facer as claimed in claim 2, further comprising a computing means receiving the signals from said two thickness detectors, computing them, and giving the result of computation to said comparator/controller means.

* * * * *